United States Patent [19]

Nicolet et al.

[11] Patent Number: 4,890,111
[45] Date of Patent: Dec. 26, 1989

[54] PASSIVE TRANSPONDER

[75] Inventors: Richard Nicolet, Granges; Daniel Koch, Crémines, both of Switzerland

[73] Assignee: ETA S.A. Fabriques d'Ebauches, Granges, Switzerland

[21] Appl. No.: 110,257

[22] Filed: Oct. 20, 1987

[30] Foreign Application Priority Data

Oct. 22, 1986 [CH] Switzerland ................ 04205/86

[51] Int. Cl.[4] .............................................. G01S 13/80
[52] U.S. Cl. .................................... 342/51; 340/505; 340/825.54; 342/42
[58] Field of Search ................ 343/802, 803, 795; 342/42-46, 50-51; 340/447, 505, 825.54

[56] References Cited

U.S. PATENT DOCUMENTS

| 4,084,162 | 4/1978 | Dubost et al. | 343/700 MS |
|---|---|---|---|
| 4,331,957 | 5/1982 | Enander et al. | 342/22 |
| 4,450,431 | 5/1984 | Hochstein | 340/505 X |
| 4,656,478 | 4/1987 | Levenberger | 342/51 |
| 4,679,046 | 7/1987 | Curtis et al. | 342/51 |

FOREIGN PATENT DOCUMENTS

| 0172445 | 2/1986 | European Pat. Off. . |
|---|---|---|
| 2311422 | 12/1976 | France . |
| 2346870 | 10/1977 | France . |
| 2455749 | 11/1980 | France . |
| 1555578 | 11/1979 | United Kingdom . |

OTHER PUBLICATIONS

"Concentrated Directional Antennas for Transmission and Reception: Rotatable Loops and Antenna-Reflector Systems of Reduced Dimensions"; QST Magazine, (10/37; pp. 27-30).
Webster's Ninth New Collegiate Dictionary; (Merriam-Webster, 1984), p. 1256.

Primary Examiner—Thomas H. Tarcza
Assistant Examiner—Bernarr Earl Gregory
Attorney, Agent, or Firm—Pollock, Vande Sande & Priddy

[57] ABSTRACT

The antenna elements of the transponder of this invention are pierced with openings and thus have a general form of loops surrounding spaces devoid of any metallic elements. This arrangement diminishes the capacitance of the stray capacitor formed by the antenna elements and the body of the person carrying the transponder, thus improving the gain thereof. The invention is particularly applicable in the search for avalanche victims.

4 Claims, 1 Drawing Sheet

PASSIVE TRANSPONDER

TECHNICAL FIELD

This invention has as its object a passive transponder including two antenna elements coupled by a non-linear passive electronic component and by a conductor arranged in parallel with the passive electronic component.

BACKGROUND OF THE INVENTION

An example of such a transponder has been described in the European patent application EP-A-0 172 445.

Its two antenna elements are each formed by a thin metallic plate having for instance a substantially rectangular form.

The passive electronic component which couples the two antenna elements is for instance a diode having a quadratic current-voltage characteristic such as the diode sold under the serial number 5 082-2835 by the Hewlett-Packard company.

Such a transponder is in particular intended to be borne by a person running the risk of being buried under an avalanche. If such an accident should happen, the person may be located with the help of a suitable detection apparatus brought into proximity therewith and including a transmitter producing electromagnetic radiation having a wavelength substantially equal to double the total length of the transponder.

When it is subjected to such electromagnetic radiation, the transponder emits a second electromagnetic radiation having a wavelength substantially equal to its total length and thus to half the wavelength of the radiation produced by the transmitter. This second electromagnetic radiation may be captured by a suitable receiver which is likewise included in the detection apparatus, thus enabling the location of the transponder and the person carrying it.

The various components of the transponder form an oscillating circuit, the resonance frequency of which must be as close as possible to the frequency of the electromagnetic radiation emitted by the detection apparatus in order that the yield of the transponder, i.e. the ratio of the quantity of energy which it emits to that which it receives, be high.

But the metallic plates forming the elements of the transponder antenna give rise, with the body of the person bearing it, to a stray capacitor, the capacitance of which influences the resonance frequency of the oscillating circuit mentioned hereinabove.

It is not possible to compensate for the effect of that stray capacitor by a proper dimensioning of the other components of the transponder since its capacitance depends directly from the distance separating such transponder from the body of the person bearing it which distance is variable in accordance with whether the transponder is worn over one or several layers of clothing.

The resonance frequency of the oscillating circuit formed by the elements of the transponder is thus practically never equal to the electromagnetic radiation, frequency emitted by the detection apparatus and the gain of the transponder is thus almost never optimum.

Furthermore, the stray capacitor transmits a portion of the energy received by the transponder, as well as a portion of the energy which it emits, to the body of the person bearing it, this bringing about likewise a diminishing of the gain of the transponder.

A purpose of the invention is to provide a transponder of the type which has been described hereinabove but which provides a higher gain than the known transponder.

SUMMARY OF THE INVENTION

This purpose is attained thanks to the fact that each of the antenna elements of the transponder in accordance with the invention is formed by a metallic ribbon arranged in a planar loop surrounding a space devoid of any metallic element.

The result of this arrangement is that for equal dimensions the capacitance of the stray capacitor formed by the antenna elements and the body of the person bearing the transponder is much less than in the transponder of the prior art.

The resonance frequency of the oscillating circuit formed by the various components of the transponder is thus much less influenced by the stray capacitor. This resonance frequency is thus always much closer to that of the electromagnetic radiation emitted by the detection apparatus and the gain of the transponder in accordance with the invention is thus better than that of the known transponder.

The quantity of energy transmitted by the stray capacitor to the body of the person bearing the transponder according to the invention is likewise diminished and this further increases its gain.

It has been determined that the form of the loops forming the antenna elements and the form of the opening bounded by these antenna elements, the non-linear passive electronic component and the conductor coupling the two antenna elements have likewise an influence on the gain of the transponder, as well as an influence on the variation of this gain from one transponder to another having the same form. This influence is probably due to the fact that if the impedances of the various components of the transponder are not at least substantially equal at the points where these components are connected to one another, there results therefrom energy losses due to reflections which are produced at these points.

A further purpose of this invention is to provide a transponder in which the form of the loops constituting the antenna elements and the form of the opening bounded by these antenna elements, the passive electronic component and the conductor coupling the two antenna elements are chosen in a manner such that the gain of the transponder is further improved and made more constant from one transponder to the other.

This purpose is attained thanks to the fact that the loops forming the antenna elements have the general form of rectangular trapezoids the small base of which are arranged facing and parallel to one another, said electronic component being connected between such small bases, and the sides perpendicular to the small bases of which are aligned with one another and coupled by a conductive portion likewise formed by a metallic ribbon having a width less than the width of said sides which are perpendicular to the bases and arranged in a manner such that its outer edge is aligned with the outer edge of said sides perpendicular to the bases, and thanks to the fact that said sides of the trapezoids perpendicular to the bases each includes a rectilinear slot extending parallel to its length, closed at the side of the large base and open at the side of the small base proximate said conductive portion, said conductor thus being formed by the portions of the sides of the trapezoids perpendicular to the bases which are located outwardly of said slots and by said conductive portion, and the space bounded by the antenna elements, the passive electronic component and the conductor having substantially the form of a T, the horizontal bar of which is formed by said slots and the vertical bar of which is formed by the space separating the small bases between the passive electronic component and the conductor.

This invention will be better understood with the help of the description to follow and the drawings which illustrate it by way of non-limiting examples.

DESCRIPTION OF THE PREFERRED EMBODIMENT

Figure 1:
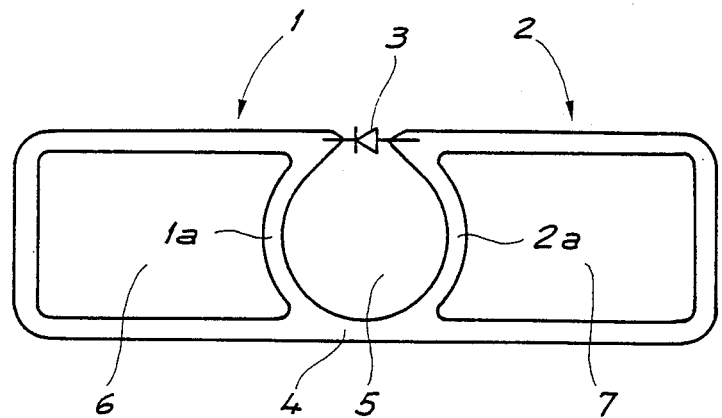
FIG. 1 is a schematic plan view of a first embodiment of the transponder in accordance with the invention.

In the embodiment shown on FIG. 1, the transponder in accordance with the invention includes two antenna elements 1 and 2 having the general form of rectangles arranged in prolongation of one from the other.

The sides 1a and 2a of the antenna elements 1 and 2 which face one another are curved towards the interior of the rectangles and coupled at one of their extremities by a diode 3, which constitutes in this example the non-linear electronic component of the transponder, and at their other extremity by a conductor 4. Diode 3 may be for instance a diode having a quadratic current voltage characteristic such as the diode sold under number 5 082-2835 by the Hewlett-Packard company.

The sides 1a and 2a of the antenna elements 1 and 2, the diode 3 and the conductor 4 thus bound a central opening 5 of substantially circular form in this example.

The antenna elements 1 and 2 are respectively pierced by openings 6 and 7 the edges of which are substantially parallel to the edges of the antenna elements 1 and 2.

The latter are manufactured in a single part with the conductor 4 by stamping from a thin sheet of metal.

They are thus constituted by a metallic ribbon arranged in a planar loop which is closed in the present example, this loop surrounding a space devoid of any metallic element.

The various components of the transponder are fastened to a support of dielectric material which has not been shown since it may be of any desired form.

The operation of the transponder of FIG. 1 is identical to that of the transponder described in the European patent application EP-A-0 172 445 already mentioned hereinabove and which will not be further explained.

It is nevertheless to be noted that with equal outer dimensions the surface of the metallic parts of the transponder according to the invention, in particular the surface of the antenna elements 1 and 2, is much less than the surface of the metallic parts of the transponder described in the patent application mentioned hereinabove, due to the fact that the antenna elements have the general form of a loop surrounding a space devoid of any metallic element.

The capacitance of the stray capacitor formed by these antenna elements 1 and 2 and the body of the person bearing the transponder is thus much less in the transponder of FIG. 1 than in that of the prior art. There results therefrom that the gain of the transponder in accordance with the invention is greater than that of the known transponder for the reasons explained hereinabove.

Figure 2:
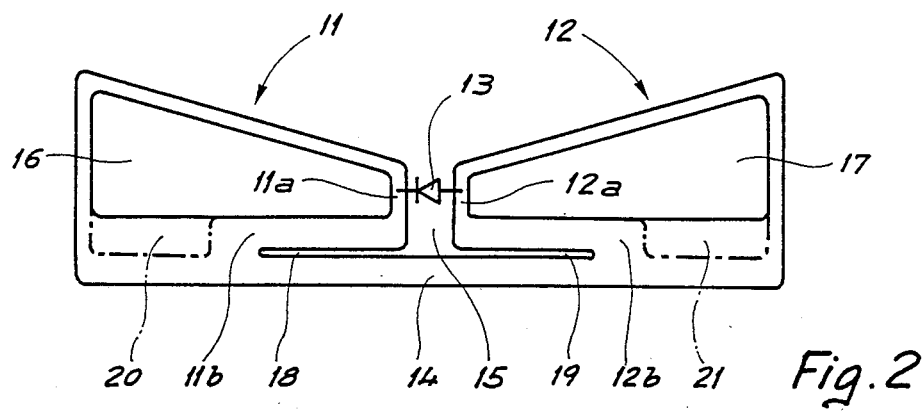
FIG. 2 is a schematic plan view of a second embodiment of the transponder in accordance with the invention.

In the embodiment shown on FIG. 2, the transponder in accordance with the invention includes as in the case of the transponder of FIG. 1, two antenna elements designated by 11 and 12 which are coupled on the one hand by a diode designated by 13 and by a conductor designated by 14. The diode 13 may be of the same type as the diode 3 of the transponder of FIG. 1.

As in the case of the transponder of FIG. 1, the antenna elements 11 and 12 are each pierced with a central opening designated respectively by 16 and 17. These antenna elements 11 and 12 have thus likewise the general form of a loop surrounding a space devoid of any metallic element, thus giving to the transponder of FIG. 2 the same advantages relative to the known transponder as in the case of FIG. 1.

The loops forming the antenna elements 11 and 12 have the general form of a rectangular trapezoid. The small bases 11a and 12a of the trapezoids are arranged facing and parallel to one another and are coupled by diode 13.

Sides 11b and 12b of the trapezoid which form these antenna elements 11 and 12 and which are perpendicular to the bases 11a and 12a are aligned with one another. These sides 11b and 12b each includes a slot 18 and 19 respectively which extends over a portion of and parallel to their length, which is closed on the side of the large bases 11c and 12c of these trapezoids and which opens into the space separating the small bases 11a and 12a. The conductor 14 is thus formed by the outer portions of the sides 11b and 12b separated from the rest of such sides by slots 18 and 19 extended and coupled to one another by a coupling conductive portion.

In this embodiment, the space 15 bounded by the antenna elements 11 and 12, the diode 13 and the conductor 14 has thus substantially the form of a T, the horizontal bar of which is formed by the slots 18 and 19 and the vertical bar of which is formed by the space separating the two small bases 11a and 12a between the diode 13 and the conductor 14.

It has been found that with equal space requirements, the gain of the transponder of FIG. 2 is not substantially greater than that of the transponder of FIG. 1, but that this gain is much more constant from one transponder to another than in the case of FIG. 1. This latter characteristic represents an important advantage of the transponder of FIG. 2 since it increases substantially the proportion of transponders recognized as satisfactory during their final manufacturing check.

It is evident that just as in the case of the corresponding elements of the transponder of FIG. 1, the antenna elements 11 and 12 and the conductor 14 of the transponder of FIG. 2 are stamped from a thin metallic sheet and fastened to a suitable support formed of dielectric material which has not been shown.

FIG. 2 likewise shows a variant of the embodiment of the transponder according to the invention which has just been described.

In this variant, the sides 11b and 12b of the antenna elements 11 and 12 are cut out following the lines drawn in dot and dashed form on FIG. 2 and the portions designated by 20 and 21 are eliminated. There results therefrom a diminishing of the surface of the metallic portions of the antenna elements 11 and 12 and thus an increase in the gain of the transponder, for the same reasons as those which have been mentioned hereinabove.

Figure 3:
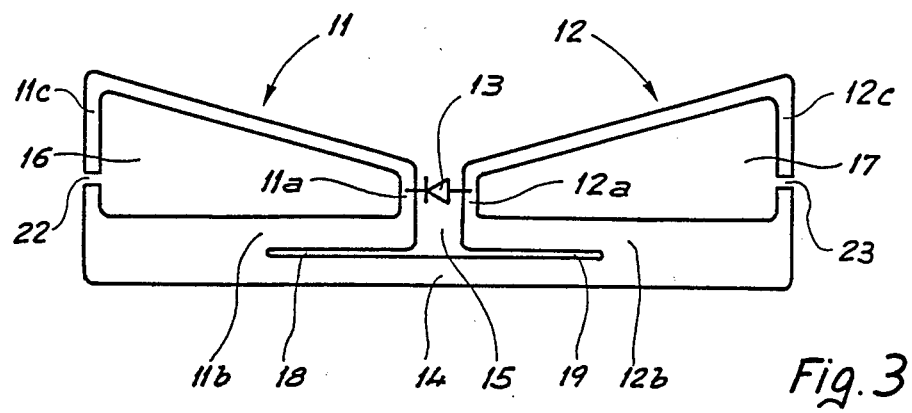
FIG. 3 is a schematic plan view of another embodiment of the transponder in accordance with the invention.

The transponder shown on FIG. 3 has the same general shape and comprises the same components as the one of FIG. 2.

The difference between these transponders resides in the transversal slots 22 and 23 which cut the large bases 11c and 12c of the antenna elements 11 and 12 of the transponder in FIG. 3.

It has been determined that these slots 22 and 23 further enhance the gain of the transponder of the invention, probably because they hinder the flow of the currents which, in their absence, are induced in the loops formed by the antenna elements 11 and 12.

What we claim is:

1. A passive radio frequency transponder comprising two antenna elements coupled by a non-linear passive electronic component and by a conductor arranged in parallel with said passive electronic component, each of said antenna elements being formed by a metallic ribbon arranged in a planar loop surrounding a space devoid of any metallic elements, and said loops each having the general form of a rectangular trapezoid with a small base, a large base and a side perpendicular to said bases, wherein said small bases face and are parallel to one another, said electronic component is connected between said small bases, said perpendicular sides are aligned with one another and connected by a conductive portion formed by a metallic ribbon having a width less than the width of said perpendicular sides and disposed so its outer edge is aligned with the outer edge of said perpendicular sides, and said perpendicular sides each includes a rectilinear slot extending parallel to its length, closed on the side of said large base and opened on the side of said small base proximate said conductive portion, said conductor thus being formed by the portions of said perpendicular sides which are located outwardly of said slots and by said conductive portion, and the space bounded by the antenna elements, the passive electronic component and the conductor having substantially the form of a T, the horizontal bar of which is formed by said slots and the vertical bar of which is formed by said space separating said small bases between said passive electronic component and said conductor.

2. The passive radio frequency transponder of claim 1, wherein said large base of each of said antenna loops is cut by a transversal slot.

3. A passive radio frequency transponder to be carried by an individual for permitting location of said individual, comprising:
   first and second antenna elements, each element comprising a rectangular trapezoid having a small base and a large base connected together by first and second sides, said first side forming a right angle with a connected base, and the small bases of said elements being parallel and spaced apart;
   a conductive strip connecting each of the first sides of said elements together, said strip forming a longitudinal slit with a portion of said first sides, said slit being open adjacent said small bases, extending towards said large bases in parallel with said first sides, and having first and second closed ends; and,
   a diode connecting said small bases together, said transponder providing a reduced capacitive coupling with its surroundings and an increased radiated signal.

4. The passive radio frequency transponder of claim 3, wherein said large base of each of said antenna elements is segmented.

* * * * *